(12) United States Patent
Cattaruzza et al.

(10) Patent No.: US 11,896,018 B2
(45) Date of Patent: Feb. 13, 2024

(54) DOUGH PRODUCTS COMPRISING ETHYLCELLULOSE AND EXHIBITING REDUCED OIL MIGRATION

(71) Applicant: Mars, Incorporated, McLean, VA (US)

(72) Inventors: Andrea Cattaruzza, Slough (GB); Stewart Radford, Slough (GB); Alejandro Gregorio Marangoni, Guelph (CA)

(73) Assignee: Mars, Incorporated, McLean, VA (US)

( * ) Notice: Subject to any disclaimer, the term of this patent is extended or adjusted under 35 U.S.C. 154(b) by 353 days.

(21) Appl. No.: 14/971,824

(22) Filed: Dec. 16, 2015

(65) Prior Publication Data

US 2016/0100590 A1 Apr. 14, 2016

Related U.S. Application Data

(63) Continuation of application No. 13/885,237, filed as application No. PCT/GB2011/001597 on Nov. 11, 2011, now abandoned.

(30) Foreign Application Priority Data

Nov. 15, 2010 (GB) ..................................... 1019314

(51) Int. Cl.
    *A21D 2/18* (2006.01)
    *A21D 2/16* (2006.01)
    *A21D 13/80* (2017.01)

(52) U.S. Cl.
    CPC ............. *A21D 2/188* (2013.01); *A21D 2/165* (2013.01); *A21D 2/181* (2013.01); *A21D 13/80* (2017.01)

(58) Field of Classification Search
    USPC ................................................... 426/94, 549
    See application file for complete search history.

(56) References Cited

U.S. PATENT DOCUMENTS

| | | | |
|---|---|---|---|
| 1,364,192 | A | 1/1921 | Friedman |
| 1,768,230 | A | 6/1930 | Borg |
| | | (Continued) | |

FOREIGN PATENT DOCUMENTS

| | | |
|---|---|---|
| AR | 078079 | 10/2011 |
| CA | 2298199 A1 | 8/2000 |
| | (Continued) | |

OTHER PUBLICATIONS

Dow Cellulosic, Ethocel, Ethylcellulose Polymers Techincal Handbook, Sep. 2005.*

(Continued)

*Primary Examiner* — Lien T Tran

(57) ABSTRACT

A cooked dough product, such as a biscuit (cookie), comprising from about 10 wt. % to about 45 wt. % of an oil and/or fat component, and from about 0.25 wt. % to about 20 wt. % of ethylcellulose, based on the weight of said product. Also provided is a method of making a cooked dough product comprising the steps of: preparing a dough containing a flour, water, from about 10 wt. % to about 45 wt. % of an oil and/or fat component, and from about 0.25 wt. % to about 20 wt. % of ethylcellulose, based on the weight of the ingredients excluding added water; and cooking the dough at a temperature of at least about 140° C. The ethylcellulose is effective to reduce oil migration from the cooked dough products.

35 Claims, 1 Drawing Sheet

(56) References Cited

U.S. PATENT DOCUMENTS

| | | |
|---|---|---|
| 2,586,615 A | 2/1952 | Sherwood |
| 2,626,216 A | 1/1953 | Sherwood |
| 2,760,867 A | 8/1956 | Kempf et al. |
| 2,863,772 A | 12/1958 | Kempf |
| 2,904,438 A | 9/1959 | Orourke |
| 2,951,763 A | 9/1960 | Keily et al. |
| 3,171,748 A | 3/1965 | Hendrik |
| 3,218,174 A | 11/1965 | Gian-Franco et al. |
| 3,424,591 A | 1/1969 | Gold et al. |
| 3,491,677 A | 1/1970 | Bracco |
| 3,638,553 A | 2/1972 | Kreuter |
| 3,935,319 A | 1/1976 | Howard |
| 4,041,188 A | 8/1977 | Cottier et al. |
| 4,045,583 A | 8/1977 | Jeffery et al. |
| 4,081,559 A | 3/1978 | Jeffrey et al. |
| 4,098,913 A * | 7/1978 | Baugher ............. A23D 9/007 426/104 |
| 4,157,405 A | 6/1979 | Itagaki et al. |
| 4,199,611 A | 4/1980 | Ito et al. |
| 4,446,116 A | 5/1984 | Krismer et al. |
| 4,446,166 A | 5/1984 | Giddey et al. |
| 4,664,927 A | 5/1987 | Finkel |
| 4,705,692 A | 11/1987 | Tanaka et al. |
| 4,726,959 A | 2/1988 | Momura et al. |
| 4,837,041 A | 6/1989 | Maruzeni et al. |
| 4,839,192 A | 6/1989 | Sagi et al. |
| 4,847,105 A | 7/1989 | Yokobori et al. |
| 4,853,235 A | 8/1989 | Tomomatsu |
| 4,855,152 A | 8/1989 | Nakano et al. |
| 4,873,109 A | 10/1989 | Tanaka et al. |
| 4,877,636 A | 10/1989 | Koyano et al. |
| 4,882,192 A | 11/1989 | Maeda et al. |
| 4,895,732 A | 1/1990 | Suwa et al. |
| 4,923,708 A | 5/1990 | Given |
| 4,980,192 A | 12/1990 | Finkel |
| 5,004,623 A | 4/1991 | Giddey et al. |
| 5,108,769 A | 4/1992 | Kincs |
| 5,149,560 A | 9/1992 | Kealey et al. |
| 5,160,760 A | 11/1992 | Takemori et al. |
| 5,190,786 A | 3/1993 | Anderson et al. |
| 5,232,734 A | 8/1993 | Takemori et al. |
| 5,279,846 A | 1/1994 | Okumura |
| 5,281,584 A | 1/1994 | Tobey |
| 5,324,533 A | 6/1994 | Cain et al. |
| 5,326,581 A | 7/1994 | Higashioka et al. |
| 5,344,664 A | 9/1994 | Fitch et al. |
| 5,348,758 A | 9/1994 | Fuisz et al. |
| 5,409,726 A | 4/1995 | Stanley et al. |
| 5,424,090 A | 6/1995 | Okawauchi et al. |
| 5,431,947 A | 7/1995 | Bennett et al. |
| 5,431,948 A | 7/1995 | Cain et al. |
| 5,439,695 A | 8/1995 | Mackey |
| 5,445,843 A | 8/1995 | Beckett |
| 5,476,676 A | 12/1995 | Cain et al. |
| 5,486,049 A | 1/1996 | Boatman et al. |
| 5,486,376 A | 1/1996 | Alander et al. |
| 5,505,982 A | 4/1996 | Krawczyk et al. |
| 5,523,110 A | 6/1996 | Mandralis et al. |
| 5,538,748 A | 7/1996 | Boatman et al. |
| 5,556,659 A | 9/1996 | De Pedro et al. |
| 5,753,296 A | 5/1998 | Girsh |
| 5,876,774 A | 3/1999 | Nalur et al. |
| 5,882,709 A | 3/1999 | Zumbe |
| 5,902,621 A | 5/1999 | Beckett et al. |
| 5,928,704 A | 7/1999 | Takeda et al. |
| 5,965,179 A | 10/1999 | Ducret et al. |
| 6,001,399 A | 12/1999 | Kilibwa et al. |
| 6,010,735 A | 1/2000 | Frippiat et al. |
| 6,025,004 A | 2/2000 | Speck et al. |
| 6,051,267 A | 4/2000 | Jury et al. |
| 6,063,408 A | 5/2000 | Yamazaki |
| 6,165,540 A | 12/2000 | Traitler et al. |
| 6,187,323 B1 | 2/2001 | Aiache |
| 6,251,448 B1 | 6/2001 | Destephen et al. |
| 6,258,398 B1 | 7/2001 | Okada et al. |
| 6,488,979 B1 | 12/2002 | Davila et al. |
| 6,620,450 B1 | 9/2003 | Davis et al. |
| 6,737,100 B1 | 5/2004 | Matsui et al. |
| 6,773,744 B1 | 8/2004 | Ward et al. |
| 6,783,783 B2 | 8/2004 | Clark et al. |
| 6,805,889 B1 | 10/2004 | Jury |
| 6,841,186 B2 | 1/2005 | Davila et al. |
| 6,875,460 B2 | 4/2005 | Cunningham et al. |
| 7,427,420 B2 | 9/2008 | Senba et al. |
| 7,579,031 B2 | 8/2009 | Simbuerger et al. |
| 7,727,574 B1 | 6/2010 | Ushioda et al. |
| 7,736,685 B2 | 6/2010 | Parsons et al. |
| 7,811,621 B2 | 10/2010 | Jury |
| 7,935,368 B2 | 5/2011 | Yamada |
| 8,017,163 B2 | 9/2011 | Simbuerger |
| 8,088,431 B2 | 1/2012 | Ward et al. |
| 8,231,923 B2 | 7/2012 | Okochi et al. |
| 8,293,314 B2 | 10/2012 | Bruese et al. |
| 8,323,015 B2 | 12/2012 | Day et al. |
| 8,545,921 B2 | 10/2013 | Gonus et al. |
| 8,607,980 B2 | 12/2013 | Aldricge et al. |
| 8,741,369 B2 | 6/2014 | Petrofsky et al. |
| 8,790,737 B2 | 7/2014 | Miguel et al. |
| 8,795,759 B2 | 8/2014 | Cantz |
| 8,802,178 B2 | 8/2014 | Wang et al. |
| 2002/0011181 A1 | 1/2002 | Cunningham et al. |
| 2002/0136818 A1 | 9/2002 | Nalur et al. |
| 2005/0069617 A1 * | 3/2005 | Diener ............. A21D 2/188 426/561 |
| 2005/0084598 A1 | 4/2005 | Higaki et al. |
| 2005/0118327 A1 | 6/2005 | Best |
| 2006/0024416 A1 | 2/2006 | Casper et al. |
| 2006/0210673 A1 | 9/2006 | Petrofsky et al. |
| 2007/0116853 A1 | 5/2007 | Krohn et al. |
| 2007/0218167 A1 | 9/2007 | Bhatia et al. |
| 2008/0241342 A1 | 10/2008 | Pearson et al. |
| 2008/0248186 A1 | 10/2008 | Bruse et al. |
| 2009/0317528 A1 | 12/2009 | Abylov et al. |
| 2010/0015279 A1 | 1/2010 | Zhang et al. |
| 2010/0123262 A1 | 5/2010 | Keller et al. |
| 2010/0129519 A1 | 5/2010 | Hennen et al. |
| 2010/0166911 A1 | 7/2010 | Upreti et al. |
| 2010/0196550 A1 | 8/2010 | Mussumeci et al. |
| 2010/0203193 A1 * | 8/2010 | Zhang ............. A21D 2/265 426/19 |
| 2010/0303987 A1 | 12/2010 | Watts |
| 2010/0323067 A1 | 12/2010 | Hess et al. |
| 2011/0008521 A1 | 1/2011 | Paggios et al. |
| 2011/0038995 A1 | 2/2011 | Thulin |
| 2011/0244082 A1 | 10/2011 | Vaman et al. |
| 2011/0274813 A1 | 11/2011 | Kowalczyk et al. |
| 2012/0058228 A1 | 3/2012 | Wales et al. |
| 2012/0091132 A1 | 4/2012 | Obolenski |
| 2012/0100251 A1 | 4/2012 | Baseeth et al. |
| 2012/0183651 A1 | 7/2012 | Marangoni |
| 2012/0183663 A1 * | 7/2012 | Marangoni ............. A23D 9/007 426/574 |
| 2012/0207880 A1 * | 8/2012 | Shin ............. A21D 13/04 426/61 |
| 2012/0282375 A1 | 11/2012 | Scavino |
| 2013/0189411 A1 | 7/2013 | Henry et al. |
| 2013/0264743 A1 | 10/2013 | Urushidani et al. |
| 2013/0292458 A1 | 11/2013 | Cheema et al. |
| 2014/0234492 A1 | 8/2014 | Matsuura et al. |
| 2014/0322391 A1 | 10/2014 | Althaus et al. |
| 2016/0000113 A1 | 1/2016 | Potter |

FOREIGN PATENT DOCUMENTS

| | | |
|---|---|---|
| CA | 2702493 | 11/2011 |
| CH | 399891 | 9/1965 |
| CH | 409603 | 3/1966 |
| CH | 410607 | 3/1966 |
| CH | 489211 | 4/1970 |
| CH | 519858 | 3/1972 |
| CH | 700968 | 11/2010 |
| CN | 101288414 | 10/2008 |
| CN | 101448414 A | 6/2009 |

(56) References Cited

FOREIGN PATENT DOCUMENTS

| | | |
|---|---|---|
| CN | 102187930 | 9/2011 |
| CN | 102423947 | 4/2012 |
| DE | 20202201 | 6/2002 |
| EP | 0072785 | 2/1983 |
| EP | 0206850 | 12/1986 |
| EP | 0407347 | 1/1991 |
| EP | 0426155 | 5/1991 |
| EP | 0442324 | 8/1991 |
| EP | 688506 | 12/1995 |
| EP | 0958747 | 11/1999 |
| EP | 0724835 | 11/2000 |
| EP | 1120455 | 8/2001 |
| EP | 2386206 | 11/2011 |
| GB | 317335 | 8/1929 |
| GB | 847340 | 9/1960 |
| GB | 904197 | 8/1962 |
| GB | 1219996 | 1/1971 |
| GB | 1538750 | 1/1979 |
| GB | 2003912 | 3/1979 |
| GB | 2028862 | 3/1980 |
| GB | 2168071 | 6/1986 |
| GB | 2391448 | 2/2004 |
| GB | 2445539 | 7/2008 |
| JP | 52148662 | 12/1977 |
| JP | 5338665 | 4/1978 |
| JP | 5359072 | 5/1978 |
| JP | 5399362 | 8/1978 |
| JP | 56127052 | 10/1981 |
| JP | 57152852 | 9/1982 |
| JP | 5914752 | 1/1984 |
| JP | 6058052 | 4/1985 |
| JP | 60207549 | 10/1985 |
| JP | 61139338 | 6/1986 |
| JP | 61224935 | 10/1986 |
| JP | 61293344 | 12/1986 |
| JP | 62122556 | 6/1987 |
| JP | 6356250 | 3/1988 |
| JP | 63192344 | 8/1988 |
| JP | 02163039 | 6/1990 |
| JP | 04258252 | 9/1992 |
| JP | 04281744 | 10/1992 |
| JP | 5227887 | 9/1993 |
| JP | 0622694 | 2/1994 |
| JP | 07123922 | 5/1995 |
| JP | 07264981 | 10/1995 |
| JP | 08168343 | 7/1996 |
| JP | 10165100 | 6/1998 |
| JP | 2000109879 | 4/2000 |
| JP | 2000166475 | 6/2000 |
| JP | 2002209521 | 7/2002 |
| JP | 2003225055 | 8/2003 |
| JP | 2004298041 | 10/2004 |
| JP | 2005034039 | 2/2005 |
| JP | 2006109762 | 4/2006 |
| WO | 9119424 | 12/1991 |
| WO | 9203937 | 3/1992 |
| WO | 9319613 | 10/1993 |
| WO | 9622696 | 8/1996 |
| WO | 9922605 | 5/1999 |
| WO | 9922605 A2 | 5/1999 |
| WO | 9945790 | 9/1999 |
| WO | 9962497 | 12/1999 |
| WO | 03053152 | 7/2003 |
| WO | 2004077964 A1 | 9/2004 |
| WO | 2006040127 | 4/2006 |
| WO | 2007112077 | 10/2007 |
| WO | 2008081175 | 7/2008 |
| WO | 2008150169 | 12/2008 |
| WO | 2009029577 | 3/2009 |
| WO | 2010063076 | 6/2010 |
| WO | 2011010105 | 1/2011 |
| WO | 2011121337 | 10/2011 |
| WO | 2012041629 | 4/2012 |
| WO | 2012146920 | 11/2012 |
| WO | 2012146921 | 11/2012 |
| WO | 2013039831 | 3/2013 |
| WO | 2013039873 | 3/2013 |
| WO | 2013092643 | 6/2013 |
| WO | 2014149551 | 9/2014 |

OTHER PUBLICATIONS

Chocolate Specifications, The Gazette of India, pp. 380-381, 484-486, Part III-Sec.4.
Almeida, et al., "Evaluation of the Physical Stability of Two Oleogels", International Journal of Pharmaceuticals, Nov. 25, 2006, pp. 73-77, 327.
Bourne, "Texture Profile Analysis", Food Technology, 1978, pp. 62-66, 32.
Dicolla, ""Characterization of Heat Resistant Milk Chocolates""", MS Thesis, Food Science, Pennsylvania State University, Feb. 26, 2009.
Goh, JAOCS, 1985, p. 730, 62(4).
Killian, ""Development of Water-in-Oil Emulsions for Application to Model Chocolate Products""", May 2, 2012.
Martinez, et al., "Influence of the Concentration of a Gelling Agent and the Type of Surfactant on the Rheological Characteristics of Oleogels", Il Farmaco, 2003, 1289-1294, 58.
Potter, Food Science, 2nd Edition, The AVI Publishing Company, Inc., Westport CT, pp. 50-51.
Siew, et al., J. Sci. Food. Agric., 1995, 69:73.
Stopsky, et al., "Chemistry of fats and by-products of processing raw fat materials", Moscow, Kolos, 1992, 153-154.
Stortz, et al., ""Heat Resistant Chocolate""", Trends in Food Science & Technology, 2011, pp. 201-214, 22.
Swern, Bailey's Industrial Oil and Fat Products, John Wiley & Sons, NY, 1979, pp. 46-51, vol. 1, 4th edition.
Zhong, et al., "The Technology of Making Cakes and the Recipe", Chemical Industry Press, Mar. 2009, 46-47.
Dow Chemical, "METHOCEL Cellulose Ethers Technical Handbook, " The DOW Chemical Company, Sep. 2002, 32 pages.
Jullander et al., "Water Solubility of Ethyl Cellulose," Acta Chem. Sound, 1955, 9(8):1291-1295.
Wen and Park, "Oral controlled release formulation design and drug delivery :theory to practice." 2010, p. 80.
"D-Sorbitol PubChem Compound summary," National Center for Biotechnology Information, PubChem Compound Database CID-5780, Sep. 16, 2004.
International Search Report and Written Opinion in PCT Appln. No. PCT/GB2011/001597, dated Feb. 9, 2012.

* cited by examiner

DOUGH PRODUCTS COMPRISING ETHYLCELLULOSE AND EXHIBITING REDUCED OIL MIGRATION

CROSS REFERENCE TO RELATED APPLICATIONS

This application is a continuation of U.S. application Ser. No. 13/885,237, filed Oct. 29, 2013 now abandon, which, in turn, is a 371 application of PCT International Patent Application No. PCT/GB2011/001597, filed Nov. 11, 2011, which, in turn, claims the benefit of GB Application No. 10193142, filed Nov. 15, 2010. Each of these applications is incorporated herein by reference in their entirety for any and all purposes.

The present invention relates to cooked dough products exhibiting reduced oil migration, and to methods of making such products.

Cooked dough products are produced by baking or otherwise cooking doughs containing a flour, water, an oil or fat component, optionally sugars, and optionally a leavening agent. Typical cooked dough products include cookies, biscuits, wafers, crackers and cakes. These products typically contain at least 1% of fat, and more usually at least 5% of fat, for example 10-30% of fat. Examples of fats that are widely employed include butter, palm oil, palm kernel oil, coconut oil, and other vegetable oils, hydrogenated vegetable oils and high melting stearin fractions of vegetable oils including blends thereof. These crystallising fats plays a multi-functional role in product attributes such as texture, appearance, structure and shelf-life stability.

A drawback of the fats conventionally used in cooked dough products is the high amount of saturated fatty acids (SAFA) contained therein. It is generally accepted that fats having a high SAFA content, and consequently a low content of unsaturated fatty acids, do not fit in a healthy diet. In addition, it is a widely held view amongst nutritionists that fats containing high levels of monounsaturated fatty acids (MUFA) and/or polyunsaturated fatty acids (PUFA) fit well into a healthy diet.

Hence, it would be desirable to replace the high SAFA fats in cooked dough products by oils that contain substantially lower amounts of saturated fatty acids and a considerable amount of PUFA.

An undesirable feature of some baked dough-based products is that lipid migration takes place in the baked goods resulting in a fat bloom due to recrystallisation of fat on the surface of the products and/or a greasy or oily surface appearance on the products after storage. Furthermore, when the products are coated with chocolate, the oil migration can result in an undesirable bloom or greasiness on the surface of the chocolate coating due to fat/oil migration from the underlying products. The use of liquid oils, such as MUFA and/or PUFA oils, to replace the crystallizing fats in dough-based products exacerbates the problem of oil migration in the products.

EP-A-0206850 describes a shelf-stable cookie having a moist, cake-like soft textured crumb structure stable over an extended period of time and having reduced seepage of shortening or fat at cookie storage temperatures. The reduced oil migration is achieved by the use of a specific partially-hydrogenated blend of soybean and palm oil. WO-A-2008150169 describes another fat blend specifically chosen to reduce fat migration in biscuits and crackers. U.S. Pat. No. 4,855,152 describes a migration inhibitor for fats and oils in baked goods. The migration inhibitor comprises of a specific disaturated-monounsaturated mixed triglyceride in an amount of 10% by weight or more of the fat in the composition.

GB-A-2391448 describes the use of a thin layer of a polyol barrier material, such as a sugar alcohol layer, to inhibit oil migration.

US-A-2010166911 describes various leavened dough formulations having reduced proofing times. The doughs may contain from 0.1 to 2% fat and from 0.2 to 1.6% or higher of one or more stabilisers, which are hydrophilic colloids and may comprise ethylcellulose.

US-A-20100015279 describes gluten-free dough products, in particular for pizza bases. The compositions may contain semi-synthetic hydrophilic colloids such as ethylcellulose, in an amount of 0.15 wt % or less. The doughs may contain oil and/or shortening in amounts up to 15% each.

US-A-20060210673 (Petrofsky) describes microwaveable dough compositions for providing frozen pizza bases having improved textural robustness. These doughs contain additives including a dietary fiber, a hydrocolloid, and from about 0.05 wt % to about 20 wt % of various "methylcelluloses." The methylcellulose is indicated to be a specific type of hydrocolloid that is able to form a gel and reversibly retains moisture when heated with water, thereby contributing to softness of the microwave baked dough product when cooked with a microwave device and then cooled.

U.S. Pat. No. 5,281,584 describes the addition of water-soluble cellulose ethers to cookies. The resulting cookies are said to be useful for lowering low-density lipoprotein serum cholesterol.

A need remains for a simple and inexpensive way to reduce fat and oil migration in cooked dough products. A further object of the present invention is to provide baked goods containing liquid oils such as MUFA and/or PUFA-containing oils that exhibit improved properties such as reduced oil migration.

In a first aspect, the present invention provides a cooked dough product comprising a flour, and an oil or fat, wherein the cooked dough product further comprises from about 0.25 wt. % to about 1 wt. % of ethylcellulose.

In a second aspect, the present invention provides a method of making a cooked dough product comprising the steps of: preparing a dough containing a flour, an oil and/or fat, and water, wherein the dough further comprises from about 0.25 wt. % to about 10 wt. % of ethylcellulose based on the dry weight of the ingredients; and baking the dough at a temperature above about 140° C.

It has been found that incorporating ethylcellulose into the cooked dough products before baking results in products that exhibit reduced oil migration after baking. This makes it possible to use healthier oils for the preparation of the cooked dough products without unacceptable oil migration from the products. The products of the present invention exhibit reduced oil migration relative to identical compositions that do not contain the ethylcellulose. Accordingly, in a third aspect the present invention provides the use of ethylcellulose, especially solid, particulate ethylcellulose, as an ingredient in doughs to reduce oil migration from cooked dough products.

The term "cooked dough product" or "baked good" refers to products made by cooking a dough or batter containing water, flour, and fat, usually with one or more sugars and/or a leavening agent and/or salt. Suitably, the product is a biscuit (i.e. a cookie in US parlance), a wafer, a cracker, pastry, a fat-containing bread such as quick breads, scones (biscuit in US parlance) or brioche, or a cake. Most suitably it is a biscuit (i.e. cookie). The products of the invention typically contain at least 1% of fat, and more usually 5%-50% of fat, for example 10-45% of fat, in embodiments 15-30% of fat, where the term "fat" refers to total fat and oil components.

The product may be coated with a fat-based coating such as chocolate over at least a part of its surface, and suitably it may be substantially completely coated with such a fat-based coating, for example by enrobing. The term "fat-based coating" suitably refers to a solid or semi-solid coating having a continuous fat phase. In embodiments, the product may be in the form of inclusions in a chocolate matrix or a chocolate-coated candy.

The weight percent ranges specified herein in relation to the ingredients such as fat/oil, flour, sugar and ethylcellulose are based on the weight of the baked dough material itself excluding any coatings such a chocolate coating, and further excluding solid inclusions such as nuts, raisins or chocolate chips.

Ethylcellulose (EC) is a nutritionally beneficial fiber and nutritional fibers are often lacking in our diets. However, it is not a soluble dietary fiber. Ethylcellulose is not significantly soluble in water; the solubility in water at 20° C. is less than 1 g/liter. In addition, ethycellulose is a GRAS material (generally regarded as safe) for use in food products making EC, particularly EC having intermediate viscosities such as about 10 cp to about 100 cp, especially suitable for the invention. The cp values refer to viscosity in centipoise of a 5% solution of the EC in 80% toluene/20% ethanol at 25° C., and therefore correlate to the molecular weight of the EC. The weight fraction of ethoxyl groups of the ethylcellulose is suitably from about 25% to about 75%, for example from about 40% to about 60%. Suitable ethylcelluloses are available from Dow Chemical Co. under the registered trade mark ETHOCEL.

The baked dough product of the present invention suitably comprises at least about 0.25 wt. % of ethylcellulose, for example at least about 1 wt. % of ethylcellulose. The maximum amount of ethylcellulose in the products is determined by cost and organoleptic considerations. The maximum is about 20 wt %, suitably up to about 1 wt. % ethylcellulose. Suitably, the product of the present invention comprises from about 2 wt. % to about 8 wt. % of ethylcellulose based on the weight of the cooked dough product, for example from about 3 wt. % to about 6 wt. % of ethylcellulose based on the weight of the cooked dough product. It follows that the product of the invention suitably comprises from about 2 wt. % to about 30 wt. % of ethylcellulose based on the total weight of the oil and/or fat component in the product, for example from about 5% to about 25% of ethylcellulose, typically from about 10% to about 20% of ethylcellulose, based on the total weight of the oil and/or fat component in the product. The optimum amount of ethylcellulose will depend on the other ingredients being used and the amount of oil in the product. For example, products containing barley flour or oat flour may require less ethylcellulose than products containing wheat flour, since products made with the former flours are less prone to oil migration.

Suitably, the method of the invention comprises adding solid ethylcellulose, for example ethylcellulose powder, to the dough mix, or to one or more components of the dough mix before or during preparation of the dough. For example, the ethylcellulose may be mixed with the flour or another dry solid component of the dough before preparation of the dough. In other embodiments, the ethylcellulose is added in dispersion with a portion of the water used to form the dough. In less preferred embodiments it may be added with a portion of the oil for example in the form of an oleogel.

Substantially or identically the same ranges of ethylcellulose content (based on the dry weight of ingredients in the dough, i.e. the weight of the ingredients excluding any added water, and excluding the weight of any solid inclusions in the dough as described below) are also appropriate for the doughs used in the processes of the invention, since the dry weight of the ingredients in the dough is similar to the dry weight of the product. It follows that the dough of the present invention suitably comprises at least about 0.2 wt. % of ethylcellulose based on the total weight of the dough, for example at least about 0.8 wt. % of ethylcellulose. Suitably, the dough of the present invention comprises from about 1.6 wt. % to about 7 wt. % of ethylcellulose based on the total weight of the dough, for example from about 2.5 wt. % to about 5 wt. % of ethylcellulose based on the weight of the dough. Likewise, it follows that the dough of the invention suitably comprises from about 2 wt. % to about 30 wt. % of ethylcellulose based on the total weight of the oil and/or fat component in the dough, for example from about 5% to about 25% of ethylcellulose, typically from about 10% to about 20% of ethylcellulose, based on the total weight of the oil and/or fat component in the dough.

The term "oleogel" herein refers to a gel having a continuous oil phase having the ethylcellulose uniformly dispersed in the gel phase and functioning as the gelling agent. The oleogels are suitably clear and translucent or even transparent materials having the physical properties of a true gel as described above. A surfactant may also be present homogeneously distributed through the gel. The oleogels are formed by dissolving the ethylcellulose in the oil at temperatures above the glass transition temperature of ethylcellulose, i.e. temperatures above about 140° C. The oleogels may be cooled before addition to the dough mix. However, addition of the ethylcellulose in the form of an oleogel is not preferred, because oleogels may not give satisfactory mixing and creaming in the dough preparation step, and the properties of the resulting baked goods are not as satisfactory.

The terms "oil" and "fat" herein encompass lipids such as triglycerides, diglycerides, monoglycerides, phosphoglycerides etc. Oils are pourable liquids at a temperature of about 20° C., whereas fats are solid or semi-solid at the same temperature. Suitably, the oil (fat) employed in accordance with the present invention comprises or consists essentially of a triglyceride. The term "fatty acid" as used herein encompasses fatty acid residues contained, for instance, in triglycerides.

The present invention offers the advantage that it enables the preparation of baked goods with liquid oils such as a low SAFA oil and acceptable oil migration properties, with little or no fat. Hence, according to certain embodiments, the total fat/oil component contains little or no hydrogenated fat. The total amount of saturated fatty acids in the fat/oil component in the products and process of the present invention typically does not exceed 35 wt. %. Even more suitably, the SAFA content of the fat/oil component does not exceed 30 wt. %, most preferably it does not exceed 25 wt. % of the total fatty acids content.

According to certain embodiments, the dough made in the process of the present invention contains not more than 10 wt. %, even more preferably not more than 8 wt. % of saturated fat. Here the weight percentage saturated fat is calculated by multiplying the total fat content (wt. %) with the weight ratio of saturated fatty acids to total fatty acids.

Expressed differently, saturated fat suitably represents less than 15%, for example less than 13% of the total caloric content of the products of the invention.

In scientific literature, many health benefits have been attributed to polyunsaturated fatty acids. For this reason, it is preferred that the fat/oil used in the products and process of the present invention contains at least about 5 wt. % of polyunsaturated fatty acids, for example from about 5% to about 15% of polyunsaturated fatty acids based on the total fatty acid content of the product. The balance of unsaturated fatty acids is made up of monounsaturated fatty acids (MUFA). The MUFA content is suitably at least about 35 wt. %, for example at least about 50 wt. %, typically at least about 75 wt. % based on the total fatty acid content of the product. Because partial hydrogenation of unsaturated oils is accompanied by the formation of trans-unsaturated fatty acids and because these trans-unsaturated fatty acids are generally regarded as undesirable, suitably the fat/oil used in the products and process of the present invention has a trans fatty acid content of less than about 2 wt. %, for example less than about 1 wt. % based on the total fatty acid content of the product.

The fat/oil component used in the products and process of the present invention advantageously contains at least about 50 wt. % of one or more oils that are liquid at 20° C., suitably at least about 90 wt. % of such oils, for example at least about 99 wt. % of such oils.

The highly unsaturated oil that is suitably used in the products and process of the present invention suitably is a vegetable oil. For example, said oil may be selected from the group consisting of sunflower oil, soybean oil, rapeseed oil, cottonseed oil, safflower oil, corn oil, olive oil and combinations thereof. Whenever the term sunflower oil is used in here, this term is meant to encompass any type of sunflower oil including, for instance, high oleic sunflower oil. The same holds for other vegetable oils, such as for instance rapeseed oil, which includes high erucic rapeseed oil.

The doughs utilized for the present invention can be prepared in a conventional manner using a mixing/creaming stage and a dough-forming stage. Suitably, the dough is a plastic, non-pourable dough, or it may be a pourable batter.

The dough typically contains 40-85 wt. % of flour. In embodiments the dough suitably contains 40-70 wt. %, for example 45-65 wt. % of flour. The flour employed in the dough is selected from conventional ingredient lines. The flour component may be any comminuted cereal grain or edible seed meal such as wheat flour, corn flour, corn starch, modified starch, rice flour, potato flour, barley flour, or the like. Wheat flour is preferred, and may be bleached or unbleached. Suitably, the wheat flour is soft wheat flour.

Suitably, the doughs used to make the products of the invention and in the processes of the invention contain 15-50% of the oil/fat component by weight of flour.

The dough may contain up to about 5 percent by weight, typically from about 1% to about 3% by weight of a leavening system, based upon the weight of the flour. A suitable leavening system comprises sodium bicarbonate, for example in combination with calcium phosphate, monobasic, and ammonium bicarbonate.

Besides flour, water, fat and optional leavening agent, the dough suitably contains one or more sugars, such as sucrose, glucose, fructose and combinations thereof. For example, the dough may contain 10-40% by weight of sugars. Typically, the total sugar solids content (exclusive of solid inclusions) of the dough is from about 20 to about 110 parts by weight of sugar per 100 parts of the flour component.

The combination of flour, water, fat, leavening agent and sugars typically represents at least 80 wt. %, most preferably at least 90 wt. % of the dough excluding solid inclusions as described below.

The initial moisture content of the dough is adjusted to provide the desired consistency to the dough to enable proper mixing, working and shaping. The total moisture content of the dough will include any water included as a separately added ingredient, as well as the moisture provided by flour (which usually contains about 12% to about 14% by weight moisture) and the moisture content of other dough additives which may be included in the formulation. Taking into account all sources of moisture in the dough, including separately added water, the total initial moisture content of the dough is generally from about 10% to about 25% by weight of the dough formulation, exclusive of solid inclusions such as nuts, raisins, chocolate chips, and the like. Moisture contents of from about 12% by weight to about 16% by weight, based upon the weight of the dough are typically used.

In addition to the foregoing, the doughs used in the process of the invention may include other additives conventionally employed in doughs for baked goods. Suitable additives include, for example, chocolate liquor, salt, milk by-products, egg or egg by-products, vanilla, pregelatinized starch, such as pregelatinized corn, wheat, and waxy maize starch, peanut butter, cereal (oatmeal) as well as inclusions such as nuts, raisins, and coconut, emulsifiers such as sorbitan monostearate, mono- and/or di-glycerides polyoxyethylene sorbitan fatty acid esters, such as polysorbates (e.g., polyoxyethylene (20) sorbitan monostearate), and sodium stearoyl-2-lactate, humectants such as humectant sugars, glycerol, sugar alcohols such as mannitol, maltitol, xylitol and sorbitol, and other polyols, as humectants are well known in the art. Additional examples of humectant polyols (i.e. polyhydric alcohols) include humectant glycols, for example propylene glycol and hydrogenated glucose syrups.

While baking times and temperatures will vary for different dough formulations, oven types, etc., in general baking times may range from about 5 minutes to about 25 minutes and baking temperatures may range from about 140° C. to about 260° C., for example about 160° C. to about 200° C.

To summarise, the dough suitably comprises, by weight excluding solid inclusions: from about 40 wt. % to about 85 wt. % of flour; up to about 30 wt. % of total sugars; from about 10 wt. % to about 40 wt. % of total oil and fat; from about 0.8% to about 6% of ethylcellulose; from about 1 wt. % to about 5 wt. % of a leavening composition, and from about 5 wt. % to about 25 wt. % of added water.

The total fat content of the cooked dough products of the invention typically is in the range of 10-45 wt. %. Furthermore, the products advantageously contain not more than 10 wt. %, for example not more than 8 wt. % of saturated fat. In terms of caloric content, saturated fat suitably represents less than 15%, for example less than 13% of the total caloric content of the product.

The water activity of the cooked dough product according to the present invention should be less than about 0.7, for example less than or equal to about 0.65, to assure microbial shelf stability. The moisture content of the cooked dough product is suitably less than about 10%, for example less than about 5%, typically about 1% to about 4% by weight.

To summarise, the cooked dough product suitably comprises, by weight excluding solid inclusions: from about 40 wt. % to about 85 wt. %, preferably about 50 wt. % to about 75 wt. %, of components derived from flour such as starch and proteins; up to about 30 wt. %, preferably about 10 wt % to about 30 wt. %, of total sugars; from about 10 wt. % to about 45 wt. % of total oil and fat; from about 0.25 wt. % to about 10 wt. %, preferably about 1 wt. % to about 6 wt. %, of ethylcellulose; and up to about 10 wt. % of water.

In embodiments, the cooked dough product is a biscuit (cookie) comprising, by weight excluding solid inclusions: from about 40 wt. % to about 75 wt. % of components derived from flour such as starch and proteins; about 10 wt % to about 30 wt. % of total sugars; from about 10 wt. % to about 45 wt. % of total oil and fat; from 1 wt. % to about 6 wt. %, preferably from about 2 wt. % to about 6 wt. % of ethylcellulose; and up to about 10 wt. % of water. Suitably, the biscuit (cookie) having this composition is at least partially coated with chocolate.

It will be appreciated that any feature that is described herein in relation to any one or more aspects of the invention may also be applied to any other aspect of the invention. The products of the invention are suitably obtainable by, or produced by, one of the methods of the invention.

These and other features of the invention will become more apparent from the following description in which reference is made to the appended drawings, wherein:

EXAMPLE 1

Figure 1:
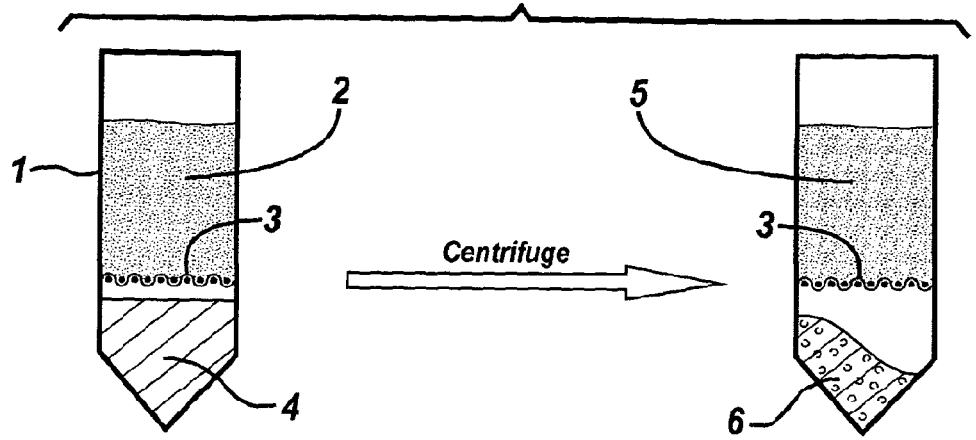
FIG. 1 shows a schematic of a method used to measure susceptibility to oil migration of biscuit (cookie) compositions.

In this example, biscuit (USA: cookie) products were made according to the formulations given in Table 1. The percentages in the Table are by weight based on the total weight of the ingredients including water. The amounts of ethylcellulose were selected so that Formulations 1-7 contained, respectively, 0%, 3%, 7%, 10%, 15%, 20% and 26.3% of ethylcellulose by weight based on the weight of the fat (oil) in the formulations.

(1) General Purpose Fat (GPF) Reference Biscuits. The dough composition of these biscuits was based on Formulation 1 in Table 1 below, which contains no ethylcellulose, but with replacement of the sunflower oil in Formulation 1 by a conventional hard biscuit fat consisting of palm oil fractions (not hydrogenated). The solid fat content of the GP fat is 45% nominal at 20° C. and 28% nominal at 25° C., as determined by ISO 8292 thermal pretreatment 9.1.1. The biscuits were made as follows. Sugar and a conventional biscuit fat were mixed at speed 5 (BEAR Varimixer, Teddy) for 1 min. Then salt solution containing water, salt and sodium bicarbonate was added over the next 2 minutes. The formulation was left to mix until a foam structure was formed. Speed was changed to 0.3. Flour was poured into the bowl as soon as possible. Continual mixing was allowed until dough formed columns at the side of the bowl and the base of the bowl was visible, with no free fat. The dough was rolled out to the desired thickness (3 mm) and cut into discs and placed on the baking tray. The biscuits were baked in 180° C. oven for 13 minutes, and then cooled on the cool tray.

(2) Sunflower Oil Reference Biscuits. Sunflower oil biscuits containing sunflower oil instead of the GP fat and having the Formulation 1 in Table 1 below were made by the same method as described above for the GPF biscuits.

(3) Sunflower Oil with Ethylcellulose PREMIX Procedure: Six sunflower oil biscuits with different combinations of ethylcellulose (EC) and other materials were produced according to the GPF procedure above having the Formulations 2 to 7, respectively, in Table 1 below. Ethylcellulose was added with sugar and sunflower oil at the first step, the other steps were the same as the standard procedure for the GP fat biscuits above.

(4) Sunflower Oil with Ethylcellulose MAINMIX Procedure: Four biscuits were made according to the same procedure as the GPF biscuit above, with different combinations of ethylcellulose (EC) and other materials having the Formulations 2, 4, 5 and 7, respectively, according to Table 1 below. The biscuits were made by premixing the ethylcellulose with the flour. Ethylcellulose was added with the wheat soft flour, the other steps were the same as the standard procedure for the GP biscuits above.

(5) Sunflower Oil with Ethylcellulose ORGANOGEL Procedure: sunflower oil and ethylcellulose were mixed and heated to 145° C. with stirring until the mixture was completely clear, then placed in the fridge (5° C.) to form an organogel. During biscuit making, sugar and organogel were mixed at speed 5 at room temperature at first, the other steps were the same as in the standard procedure. Four biscuits with the Formulations 2, 3, 4 and 5, respectively, from Table 1 were made in this way by predispersing the ethylcellulose as an organogel in the oil phase.

TABLE 1

| Forumlation # | 1 | | 2 | | 3 | | 4 | |
|---|---|---|---|---|---|---|---|---|
| | % | g | % | g | % | g | % | g |
| Caster Sugar | 17.00 | 170.00 | 16.90 | 170.00 | 16.78 | 170.00 | 16.68 | 170.0 |
| Sunflower Oil | 19.00 | 190.00 | 18.89 | 190.00 | 18.75 | 190.00 | 18.65 | 190.0 |
| Soft wheat flour | 56.00 | 560.00 | 55.68 | 560.00 | 55.26 | 560.00 | 54.96 | 560.0 |
| Water | 7.60 | 76.00 | 7.56 | 76.00 | 7.50 | 76.00 | 7.46 | 76.00 |
| Salt | 0.26 | 2.60 | 0.26 | 2.60 | 0.26 | 2.60 | 0.26 | 2.60 |
| Sodium Bicarbonate | 0.14 | 1.40 | 0.14 | 1.40 | 0.14 | 1.40 | 0.14 | 1.40 |
| Ethylcelluse | 0 | 0 | 0.57 | 5.70 | 1.31 | 13.30 | 1.86 | 19.00 |
| Total | | 1000 | | 1005.70 | | 1013.30 | | 1019.0 |

TABLE 1-continued

| Forumlation # | 5 | | 6 | | 7 | |
|---|---|---|---|---|---|---|
| | % | g | % | g | % | g |
| Caster Sugar | 16.53 | 170.00 | 16.38 | 170.00 | 16.23 | 170.00 |
| Sunflower Oil | 18.47 | 190.00 | 18.30 | 190.00 | 18.14 | 190.00 |
| Soft wheat flour | 54.45 | 560.00 | 53.95 | 560.00 | 53.46 | 560.00 |
| Water | 7.39 | 76.00 | 7.32 | 76.00 | 7.26 | 76.00 |
| Salt | 0.25 | 2.60 | 0.25 | 2.60 | 0.25 | 2.60 |
| Sodium Bicarbonate | 0.14 | 1.40 | 0.13 | 1.40 | 0.13 | 1.40 |
| Ethylcelluse | 2.77 | 28.50 | 3.66 | 38.00 | 4.76 | 50.00 |
| Total | | 1028.50 | | 1038.00 | | 1050.00 |

Ethylcellulose power: Ethocel std 20 premium, Dow Wolff Cellulosics
Sunflower Oil: FLORA Pure Sunflower Oil, Princes Ltd.
Sodium: Bicarbonate: Bicarbonate of Soda, Super Cook Ltd.
Sugar: Caster Sugar for baking, Tate & Lyle Procedure 1

To accurately define oil binding capacity, samples of each biscuit prepared in the Examples were pulverized and oil migration from the powdered biscuit was measured with the following centrifuge method. Every sample was divided in four sub-samples to get a coefficient of deviation smaller than 10%.

As shown in FIG. 1, the biscuit powder 2 was added into a centrifuge tube 1 (size=50 ml, Sterilin) with a filter paper roll 4 at its bottom and a metal sieve 3 between filter paper 4 and biscuit powder 2. The sample was centrifuged (HE-VAEUS Multifuge.®. 3 SR+Centrifuge, Thermo Scientific) for 30 min (8999 rpm at 30° C.). During centrifugation, oil transferred from biscuit powder to filter paper. After centrifugation, the oil-depleted biscuit powder 5 and the filter paper containing the transferred oil 6 remain separated by the sieve 3. The percentage oil released was calculated by weighing the filter paper before and after centrifugation.

$$p = \frac{g_2 - g_1}{g_B} \times 100\%$$

P: Oil Release as a Percent of Biscuits (%)
$g_2$: Filter paper weight after centrifuge
$g_1$: Filter paper weight before centrifuge
$g_B$: Weight of Biscuit powder FIG. 2 depicts the oil-binding capacity of the GP fat reference biscuit, the PREMIX sunflower oil biscuits, MAINMIX sunflower oil biscuits, ORGANOGEL sunflower oil biscuits by oil released as a percent of biscuits after centrifugation.

Figure 2:
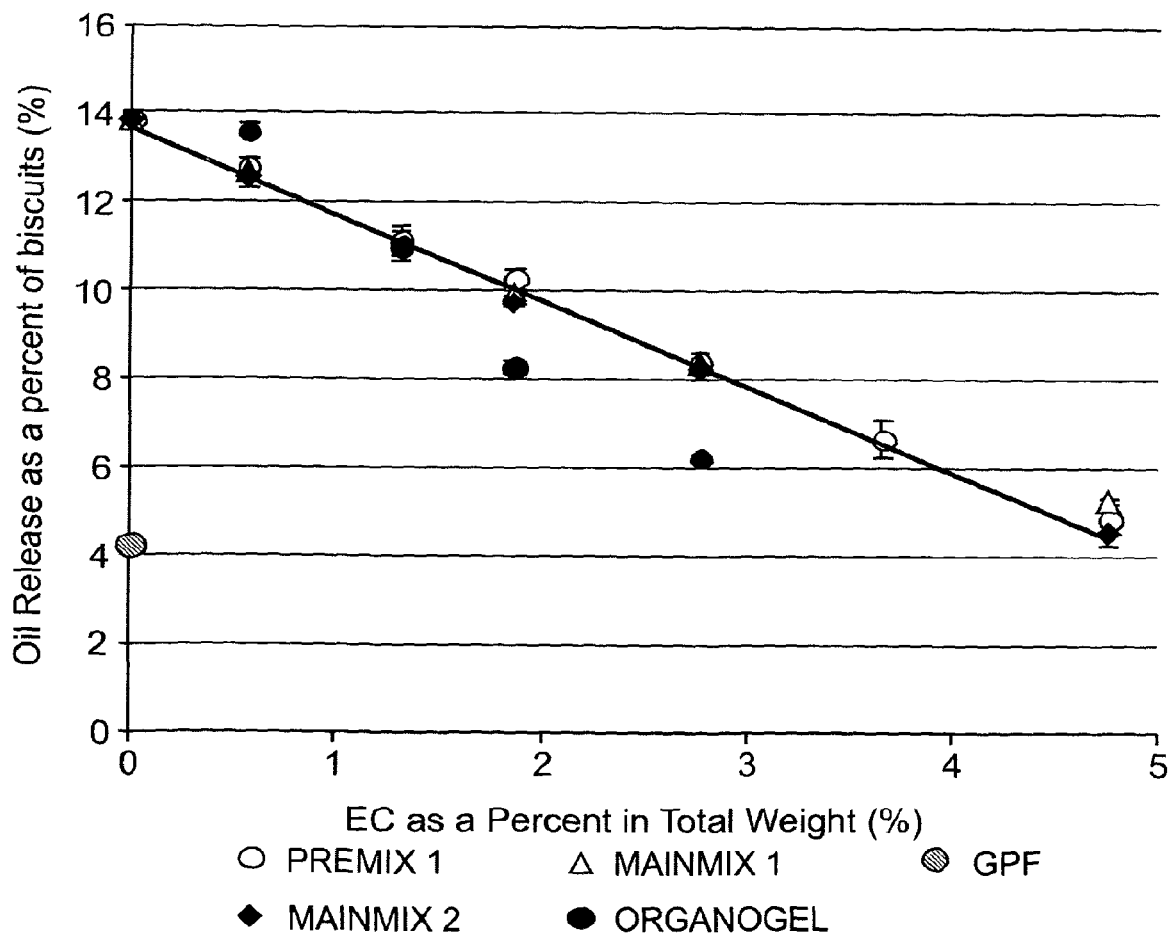
FIG. 2 shows a graph of measured oil loss versus ethylcellulose content for various biscuit (cookie) compositions. The ethylcellulose content is in weight percent based on the total weight of the dough used to make the biscuits. The measured oil loss is in weight percent based on the weight of the biscuits.

As shown in FIG. 2, the amount of ethylcellulose present in the biscuits played a significant role in oil binding. Increasing the amount of ethylcellulose present in the sunflower oil biscuits increased the amount of oil binding and decreased the amount that leaked. MAINMIX 1 and MAINMIX 2 are two repeats of the same set of experiments for the different levels of EC; the oil release results are not significantly different in the two sets, demonstrating a good repeatability of the experiment.

PREMIX VS MAINMIX: Neither procedure changed quality or taste of biscuits dramatically. There was no significant difference between PREMIX and MAINMIX procedures, so MAINMIX procedure can be used as the method to make biscuits in the factory process, as it is an easier way to add ethylcellulose.

PREMIX/MAINMIX VS ORGANOGEL: The oil release of biscuits made with the ORGANOGEL procedure was higher than PREMIX/MAINMIX at low EC concentration (0.6%), but much lower at higher EC concentration (1.9%, 2.8%). However, at the higher ethylcellulose concentrations (1.9%, 2.8%), the baking quality and taste of biscuits made by the ORGANOGEL procedure were not as good. The porous structure in the biscuits was not homogeneous, the biscuit surface was irregular and bumped, as if the water could not come out in a homogeneous way during baking. This indicates that forming the gel before baking interferes with the baking process.

As a conclusion, ethylcellulose worked well on trapping oil and reducing oil release from biscuits. Increasing the amount of ethylcellulose present in the sunflower oil biscuits increased the amount of oil binding and decreased the amount leaked.

The MAINMIX procedure can be used to make biscuits with ethylcellulose. There was a linear trend between ethylcellulose concentration in total weight and oil release as a percentage in biscuits, which could be fitted to the equation: y=−1.9444x+13.66. The equation maybe used to calculate the concentration of ethylcellulose when the specific oil release percent is required. Thus, when the oil release of sunflower oil is equal to GP fat biscuits, the concentration of ethylcellulose would be 4.85% based on total weight of the dough. Higher amounts of ethylcellulose may be needed to match the oil migration properties of some crystallising fats.

It will be appreciated that any of the above biscuit examples can be coated with chocolate, for example in a conventional enrober. The resulting chocolate-coated products are expected to exhibit reduced oil migration through the chocolate coating.

What is claimed is:

1. A method for reducing oil migration in a baked dough product, comprising:
    (a) preparing a dough comprising a flour, water, and from about 10 percentage by weight to about 45 percentage by weight of at least one of an oil and a fat, which comprises one or more oils that are liquid at 20° C.; and
    (b) baking the dough, wherein the dough further comprises an oil migration-reducing agent, wherein the oil migration-reducing agent comprises from 2.5 percentage by weight to about 20 percentage by weight of ethyl cellulose based on the total weight of the baked dough product, wherein the ethyl cellulose has a viscosity between about 10 cp and about 100 cp, as measured with 5% solution in 80% toluene/20% ethanol at 25° C. and a solubility in water at 20° C. of less than 1 g/liter, and wherein the oil migration in the baked dough product is reduced compared to a baked dough product produced from the same dough composition without the ethyl cellulose.

2. The method of claim 1, wherein said ethyl cellulose is in the form of solid, particulate ethyl cellulose and is added to (i) the dough, (ii) one or more dry ingredients of the dough, or both (i) and (ii) before mixing the dough.

3. The method of claim 1, wherein said baked dough product comprises from about 3 percentage by weight to about 6 percentage by weight of ethyl cellulose based on the weight of the baked dough product.

4. The method of claim 1, wherein said baked dough product comprises 2.5 percentage by weight to about 8 percentage by weight ethyl cellulose based on the weight of said baked dough product.

5. The method of claim 1, wherein said baked dough product comprises from 2.5 percentage by weight to about 5 percentage by weight of said ethyl cellulose based the weight of said baked dough product.

6. The method of claim 1, wherein the baked dough product comprises 2.5 percentage by weight to about 6 percentage by weight of ethyl cellulose based on the weight of the baked dough product.

7. The method of claim 1, wherein the baked dough product comprises 3.66 percentage by weight to 20 percentage by weight of ethyl cellulose based on the weight of the baked dough product.

8. The method of claim 1, wherein the baked dough product comprises 4.76 percentage by weight to 20 percentage by weight of ethyl cellulose based on the weight of the baked dough product.

9. The method of claim 1, wherein the baked dough product comprises about 15 percentage by weight to about 30 percentage by weight of at least one of an oil and a fat.

10. The method of claim 1, wherein the at least one of an oil and a fat comprises one or more saturated fatty acids, and wherein the amount of saturated fatty acids does not exceed 35 percentage by weight of the total amount of the oil and fat.

11. The method of claim 10, wherein the amount of the one or more saturated fatty acids does not exceed 30 percentage by weight of the total amount of the oil and fat.

12. The method of claim 10, wherein the amount of the one or more saturated fatty acids does not exceed 25 percentage by weight of the total amount of the oil and fat.

13. The method of claim 1, wherein the at least one of an oil and a fat comprises one or more polyunsaturated fatty acids, and wherein the amount of polyunsaturated fatty acids is about 5% to about 15% of the total amount of the oil and fat.

14. The method of claim 1, wherein the baked dough product comprises saturated fat, and wherein the amount of saturated fat is not more than 10 percentage by weight of the baked dough product.

15. The method of claim 14, wherein the amount of saturated fat is not more than 8 percentage by weight of the baked dough product.

16. The method of claim 1, wherein the dough is baked at a temperature of at least about 140° C.

17. A baked dough product produced in accordance with a method comprising:
(a) preparing a dough comprising a flour, water, and from about 10 percentage by weight to about 45 percentage by weight of at least one of an oil and a fat, which comprises one or more oils that are liquid at 20° C.; and
(b) baking the dough, wherein the dough further comprises an oil migration-reducing agent, wherein the oil migration-reducing agent comprises from about 2.5 percentage by weight to about 20 percentage by weight of ethyl cellulose based on the total weight of the baked dough product, wherein the ethyl cellulose has a viscosity between about 10 cp and about 100 cp, as measured with 5% solution in 80% toluene/20% ethanol at 25° C., and a solubility in water at 20° C. of less than 1 g/liter and wherein the oil migration in the baked dough product is reduced compared to a baked dough product produced from the same dough composition without the ethyl cellulose.

18. The baked dough product of claim 17, wherein the baked dough product comprises 2.5 percentage by weight to about 8 percentage by weight of ethyl cellulose based on the weight of the baked dough product.

19. The baked dough product of claim 17, wherein the baked dough product comprises 2.5 percentage by weight to about 6 percentage by weight of ethyl cellulose based on the weight of the baked dough product.

20. The baked dough product of claim 17, wherein the baked dough product comprises about 3 percentage by weight to about 6 percentage by weight of ethyl cellulose based on the weight of the baked dough product.

21. The baked dough product of claim 17, wherein the baked dough product comprises 2.5 percentage by weight to about 5 percentage by weight of ethyl cellulose based on the weight of the baked dough product.

22. The baked dough product of claim 17, wherein the baked dough product comprises 3.66 percentage by weight to 20 percentage by weight of ethyl cellulose based on the weight of the baked dough product.

23. The baked dough product of claim 17, wherein the baked dough product comprises 4.76 percentage by weight to 20 percentage by weight of ethyl cellulose based on the weight of the baked dough product.

24. The baked dough product of claim 17, wherein the baked dough product comprises about 15 percentage by weight to about 30 percentage by weight of at least one of an oil and a fat.

25. The baked dough product of claim 17, wherein the at least one of an oil and a fat comprises one or more saturated fatty acids, and wherein the amount of saturated fatty acids does not exceed 35 percentage by weight of the total amount of the oil and fat.

26. The baked dough product of claim 25, wherein the amount of the one or more saturated fatty acids does not exceed 30 percentage by weight of the total amount of the oil and fat.

27. The baked dough product of claim 25, wherein the amount of the one or more saturated fatty acids does not exceed 25 percentage by weight of the total amount of the oil and fat.

28. The baked dough product of claim 17, wherein the at least one of an oil and a fat comprises one or more polyunsaturated fatty acids, and wherein the amount of polyunsaturated fatty acids is about 5% to about 15% of the total amount of the oil and fat.

29. The baked dough product of claim 17, wherein the baked dough product comprises saturated fat, and wherein the amount of saturated fat is not more than 10 percentage by weight of the product.

30. The baked dough product of claim 29, wherein the amount of saturated fat is not more than 8 percentage by weight of the product.

31. The baked dough product of claim 17, wherein the dough is baked at a temperature of at least about 140° C.

32. A baked dough product produced in accordance with a method comprising:
(a) preparing a dough comprising:
a flour;
water;
about 10 wt % to about 45 wt % of at least one of an oil and a fat, which comprises one or more oils that are liquid at 20° C.;
about 10 wt % to about 40 wt % of a sugar selected from sucrose, glucose, fructose, and combinations thereof;
about 1 wt % to about 5 wt % of a leavening agent, selected from sodium bicarbonate, calcium phosphate monobasic, ammonium bicarbonate, and combinations thereof;
about 3 wt % to about 20 wt% of ethyl cellulose based on the total weight of the baked dough product, wherein the ethyl cellulose has a viscosity between about 10 cp and about 100 cp, as measured with 5% solution in 80% toluene/20% ethanol at 25° C., and a solubility in water at 20° C. of less than 1 g/liter; and
(b) baking the dough; wherein the oil migration in the baked dough product is reduced compared to a baked dough product produced from the same dough composition without the ethyl cellulose.

33. The baked dough product of claim 32, wherein the dough comprises about 10 wt % to about 30 wt % of a sugar.

34. The baked dough product of claim 32, wherein the dough comprises one or more additives selected from chocolate liquor, salt, milk by-products, egg or egg by-products, vanilla, pregelatinized starch, peanut butter, cereal, one or more inclusions, emulsifiers, humectants, and sugar alcohols.

35. The baked dough product of claim 32, wherein the dough is baked at a temperature of at least about 140° C.

* * * * *